United States Patent Office 2,773,884
Patented Dec. 11, 1956

2,773,884

PROCESS FOR THE MANUFACTURE OF COMPOUNDS OF THE STEROID SERIES

Leopold Ruzicka, Hans Heusser, and Oskar Jeger, Zurich, Switzerland, assignors to Ciba Pharmaceutical Products, Inc., Summit, N. J.

No Drawing. Application December 29, 1952,
Serial No. 328,505

Claims priority, application Switzerland April 4, 1952

2 Claims. (Cl. 260—397.2)

This invention relates to the manufacture of compounds of the steroid series and in particular of $\alpha{:}\beta$-unsaturated ketones of the steroid series corresponding to the following partial formula showing rings B and C:

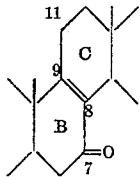

These compounds are important intermediate products for the manufacture of steroids unsubstituted in ring B and having oxygen in 11-position. To this class of substances belong several hormones of the suprarenal cortex, such as cortisone, which is $\Delta^4$-3:11:20-triketo-17$\alpha$:21-dihydroxy-pregnene and the Substance F of Kendall, which is $\Delta^4$-3:20-diketo-11$\beta$:17$\alpha$:21-trihydroxy-pregnene.

The specified 8:9-unsaturated 7-ketones have hitherto been very difficult to prepare. Thus Stavely and Bollenback obtained $\Delta^{8:9:22:23}$-3$\beta$-acetoxy-7-keto-ergostadiene in 4 percent yield by oxidation of $\Delta^{7:8:22:23}$-3$\beta$-acetoxy-ergostadiene.

The present invention is based on the observation that the specified $\alpha{:}\beta$-unsaturated 7-ketones of the steroid series corresponding to the following partial formula showing rings B and C

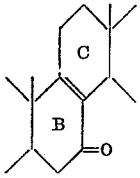

are obtained in considerably better yield when 7-keto-8:9-oxido-steroids are treated with a metal and an acid, especially with zinc and glacial acetic acid. The operation is preferably conducted at elevated temperature.

The 7-keto-8:9-oxido steroids employed as starting materials in accordance with the present invention belong to the cyclopentanopolyhydrophenanthrene or polyhydrochrysene series. Especial importance is attached to the derivatives of ergostane, cholestane, coprostane, sitostane, stigmastane, cholane, allocholane, spirostane, pregnane, androstane and etiocholane. The starting materials can also be further substituted, for example in 3, 5, 6, 17, 20- and/or 21-position by free or functionally converted hydroxyl or oxo groups, such as acyloxy groups, for example, acetoxy, propionyloxy, benzoyloxy or tosyloxy groups, by alkoxy groups, for example methoxy or ethoxy groups, by acetalized oxo groups, by free or functionally converted carboxyl groups, such as nitrile or esterified carboxyl groups, by a substituted or unsubstituted acyl group, for example the acetyl or hydroxyacetyl group, or by a lactone, for example butenolide group. The starting materials can have any configuration and can also contain double bonds, as for example in 5:6- or 22:23-position.

The starting materials for use according to the present invention are easily obtainable by treatment of 7:8-unsaturated steroids with oxidizing agents, especially with tertiary butyl chromate in acetic acid solution.

The products of the invention are intended to be used in therapy or as intermediate products for the manufacture of therapeutically applicable compounds.

The following example illustrates the invention, the relation between part by weight and part by volume being the same as that between the gram and cubic centimeter:

1 part by weight of $\Delta^{22:23}$-3$\beta$-acetoxy-7-keto-8:9-oxido-ergostene of M. P. 229–230° C. is dissolved in 150 parts by volume of glacial acetic acid, treated with 1 part by weight of zinc dust and the solution heated to boiling within 30 minutes. Thereupon a further 2 parts by weight of zinc dust are introduced in 5 portions into the boiling solution within 30 minutes. The solution is filtered from zinc dust and the filtrate treated with water, the solution extracted with ether and the ethereal layer washed with water, sodium bicarbonate solution and water, dried and evaporated. The residue (0.95 part by weight) constitutes practically pure $\Delta^{8:9:22:23}$-3$\beta$-acetoxy-7-keto-ergostadiene. After triple recrystallization from methanol-water, the compound melts at 204–206° C.; $[\alpha]_D = -56°$. In the ultraviolet absorption spectrum a characteristic maximum occurs at 253 m$\mu$, log $\epsilon=4.05$. In the infra-red absorption spectrum, the characteristic doublet for $\alpha{:}\beta$-unsaturated keto groups is observed at 1667 and 1600 cm.$^{-1}$.

The $\Delta^{22:23}$-3$\beta$-acetoxy-7-keto-8:9-oxido-ergostene used as starting material may be prepared with advantage in the following manner:

3 parts by weight of $\Delta^{7:8:22:23}$-3$\beta$-acetoxy-ergostadiene are dissolved in a mixture of 30 parts by volume of glacial acetic acid and 60 parts by volume of carbon tetrachloride and treated with good stirring at 0° C. with a solution, dried over sodium sulfate, of 5 parts by weight of chromium trioxide in 42 parts by volume of carbon tetrachloride and 13 parts by volume of tertiary butanol. The reaction mixture is allowed to remain for 16 hours at 0° C. and then for 3 days at 20° C. The excess of oxidizing agent is then destroyed at 0° C. by the addition in portions of 7.5 parts by weight of powdered oxalic acid or 10 parts by volume of methanol. The reaction solution is diluted with carbon tetrachloride, washed successively three times with water, with sodium bicarbonate solution and again with water, dried and evaporated. The crude product yields on recrystallization from ether-methanol about 1.2 parts by weight of $\Delta^{22:23}$-3$\beta$-acetoxy-7-keto-8:9-oxido-ergostene of M. P. 229–230° C.; $[\alpha]_D = -47°$. In the ultraviolet absorption spectrum the compound shows only an end absorption at 220 m$\mu$. In the infra-red absorption spectrum, in the 1700 cm.$^{-1}$ region, there can be observed in addition to the acetate band at 1730 cm.$^{-1}$, the marked absorption of the isolated 6-ring ketone at 1715 cm.$^{-1}$.

The mother liquors from the crystallization of the $\Delta^{22:23}$-3$\beta$-acetoxy-7-keto-8:9-oxido-ergostene are chromatographically separated over 60 parts by weight of alumino. The petrol ether-benzene (1:1) eluates (a total of 0.6–0.8 part by weight) crystallize from acetone-water in needles of M. P. 152–153° C.; $[\alpha]_D = -98°$. In the ultra-violet absorption spectrum the $\Delta^{22:23}$-3$\beta$-acetoxy-7-keto-8:14-oxido-ergostene exhibits only an end absorption at 220 m$\mu$. In the infra-red absorption spectrum, in addition to the acetate band at 1730 cm.$^{-1}$, the absorption of the isolated 6-ring ketone at 1715 cm.$^{-1}$ can be observed.

What is claimed is:

1. A process for the manufacture of $\Delta^{8:9;22:23}$-3$\beta$-lower alkylcarbonyloxy-7-keto ergostadiene, which comprises the step of treating mono keto $\Delta^{22:23}$-3$\beta$-lower alkylcarbonyloxy-8:9-oxido-ergostene, the keto group of which is in the 7-position, with zinc and an acid.

2. A process for the manufacture of $\Delta^{8:9;22:23}$-3$\beta$-acetoxy-7-keto ergostadiene, which comprises the step of treating $\Delta^{22:23}$-3$\beta$-acetoxy-7-keto-8:9-oxido-ergostene, with zinc and an acid.

References Cited in the file of this patent

FOREIGN PATENTS 507,987     Belgium _____ June 21, 1952

OTHER REFERENCES

Helv. Chim. Acta, August 1951, vol. 34, pp. 2106–32.